US010191739B2

(12) United States Patent
Matsumoto et al.

(10) Patent No.: US 10,191,739 B2
(45) Date of Patent: Jan. 29, 2019

(54) STATE ESTIMATION PROCESSOR AND STATE ESTIMATION SYSTEM

(71) Applicant: MegaChips Corporation, Osaka-shi (JP)

(72) Inventors: Mahito Matsumoto, Osaka (JP); Tomoshige Kato, Osaka (JP); Takehiro Yoshimura, Osaka (JP); Takio Yamaoka, Osaka (JP); Yusuke Sasaki, Osaka (JP); Shingo Hamaguchi, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 107 days.

(21) Appl. No.: 15/273,059

(22) Filed: Sep. 22, 2016

(65) Prior Publication Data
US 2017/0010891 A1 Jan. 12, 2017

Related U.S. Application Data

(63) Continuation of application No. PCT/JP2015/059556, filed on Mar. 27, 2015.

(30) Foreign Application Priority Data

Mar. 31, 2014 (JP) .................. 2014-071782

(51) Int. Cl.
G06F 1/32 (2006.01)
G06F 9/30 (2018.01)
G06F 7/00 (2006.01)
G06F 3/01 (2006.01)
G06F 9/38 (2018.01)
G06F 15/80 (2006.01)

(52) U.S. Cl.
CPC ............. *G06F 9/3001* (2013.01); *G06F 3/01* (2013.01); *G06F 7/00* (2013.01); *G06F 9/30083* (2013.01);
(Continued)

(58) Field of Classification Search
CPC .... G01C 21/16; G06F 15/8007; G06F 1/3243
See application file for complete search history.

(56) References Cited

U.S. PATENT DOCUMENTS

2001/0021941 A1* 9/2001 Arakawa ............... G06F 7/5443
708/514
2006/0161377 A1 7/2006 Rakkola et al.
(Continued)

FOREIGN PATENT DOCUMENTS

JP 2009-8680 1/2009
JP 4243684 3/2009
JP 2010-522344 7/2010
(Continued)

OTHER PUBLICATIONS

Office Action dated Aug. 1, 2017 in Japanese Patent Application No. 2014-071782 (with English language translation).
(Continued)

Primary Examiner — Albert Wang
(74) Attorney, Agent, or Firm — Xsensus LLP

(57) ABSTRACT

A microprocessor unit (MPU) connected to external sensors is provided with an interface unit that acquires detection information acquired by the external sensors and a digital signal processor (DSP) that estimates the state of a target object on the basis of the detection information acquired by the interface part and generates state information. The DSP is provided with a SIMD type arithmetic processing circuitry that processes a plurality of information with one command and is provided with single precision floating point computing units. The interface part outputs the state information generated by the DSP to an externally provided main processor. Therefore, power consumption can be reduced.

14 Claims, 5 Drawing Sheets

(52) U.S. Cl.
CPC ........ *G06F 9/3887* (2013.01); *G06F 15/8007* (2013.01)

(56) References Cited

U.S. PATENT DOCUMENTS

| | | |
|---|---|---|
| 2008/0234935 A1 | 9/2008 | Wolf et al. |
| 2009/0005986 A1 | 1/2009 | Soehren |
| 2010/0033424 A1 | 2/2010 | Kabasawa et al. |
| 2012/0136573 A1* | 5/2012 | Janardhanan ........ G01C 21/165 701/512 |

FOREIGN PATENT DOCUMENTS

| | | |
|---|---|---|
| WO | WO 2006/070272 A2 | 7/2006 |
| WO | WO 2009/008411 A1 | 1/2009 |

OTHER PUBLICATIONS

International Search Report dated May 19, 2015 in PCT/JP2015/059556, filed Mar. 27, 2015 (with English Translation).
Written Opinion dated May 19, 2015 in PCT/JP2015/059556, filed Mar. 27, 2015.
Koichi Nishiwaki et al. "Short Cycle Pattern Generation for Online Walking Control of Humanoids", Journal of the Robotics Society of Japan, vol. 25, No. 6, whole No. 178, Sep. 15, 2007, 8 pages (with English Abstract).
The International Preliminary Report on Patentability and Written Opinion dated Oct. 4, 2016 in PCT/JP2015/059556.
Decision of Refusal dated Jan. 9. 2018 in Japanese Patent Application No. 2014-71782 (with English language translation).

\* cited by examiner

F I G . 4

SEQUENTIAL PROCESSING

| CYCLE | CALCULATION | DATA |
|---|---|---|
| 1 | Load | $\alpha 0$ |
| 2 | Pointer | $\alpha 0$ |
| 3 | Multiplication | $\alpha 0$ |
| 4 | Store | $\alpha 0$ |
| 5 | Load | $\alpha 1$ |
| 6 | Pointer | $\alpha 1$ |
| 7 | Multiplication | $\alpha 1$ |
| 8 | Store | $\alpha 1$ |
| ⋮ | ⋮ | ⋮ |
| 43 | Multiplication | $\gamma 2$ |
| 44 | Store | $\gamma 2$ |
| 45 | Load | $\gamma 3$ |
| 46 | Pointer | $\gamma 3$ |
| 47 | Multiplication | $\gamma 3$ |
| 48 | Store | $\gamma 3$ |

PROCESSING OF THE INVENTION

| CYCLE | L/S | 303 | 304 |
|---|---|---|---|
| 1 | $\alpha$ | BLANK | BLANK |
| 2 | $\beta$ | $\alpha$ | BLANK |
| 3 | $\gamma$ | $\beta$ | $\alpha$ |
| 4 | $\alpha$ | $\gamma$ | $\beta$ |
| 5 | $\beta$ | BLANK | $\gamma$ |
| 6 | $\gamma$ | BLANK | BLANK |

STATE ESTIMATION PROCESSOR AND STATE ESTIMATION SYSTEM

BACKGROUND OF THE INVENTION

Field of the Invention

The present invention relates to techniques for estimating a state of an object in a terminal device etc. In particular, the present invention relates to techniques for reducing the power consumption of the terminal device when estimating the state of the object.

Description of the Background Art

Conventionally, a technique to incorporate a sensor in a terminal device is known. In the known technique, the behavior state of the user having the terminal device and the state of the terminal device are estimated based on a value detected by the sensor. As an applicable field of such technology, PDR (Pedestrian Dead Reckoning) and the like are known (Japanese Patent No. 4243684), for example.

However, in the application to take some kind of actions while estimating the state of an object, it is necessary to always continue observing the object. Therefore, the sensor which detects the observed value used as the foundation for estimating the state always has the situation that it must continue working. And the processor which processes the observed value always acquired by the sensor also had to continue working, without resting, and had the problem that power consumption increased. Especially, in the carried terminal device, a power supply is limited to a battery charger, the request to reduce of power consumption has a high level.

SUMMARY OF THE INVENTION

It is an object of the present invention to provide techniques to estimate a state of an object while controlling power consumption.

Thus, the present invention is directed to a state estimation processor.

According to an aspect of the present invention, the state estimation processor connected to an external detection device and an external computer comprises: an interface circuitry configured to obtain detection information obtained by the external detection device and output state information to the external computer; and a calculating circuitry including a SIMD (Single Instruction Multiple Data) type arithmetic processing circuitry processes a plurality of information by one command and provided with a single precision floating point computing unit; the calculating circuitry configured to: estimate a state of an object based on the detection information obtained by the interface circuitry; and generate the state information according to the state of the object.

The present invention is also directed to a state estimation system.

According to an aspect of the present invention, the state estimation system comprises: a detection device obtains detection information; a main processor works in first operation mode, and second operation mode in which power consumption is smaller than the first operation mode; and a state estimation processor connected to the detection device and the main processor; wherein the state estimation processor, including: an interface circuitry configured to obtain detection information obtained by the detection device and output state information to the main processor; and a calculating circuitry including a SIMD type arithmetic processing circuitry processes a plurality of information with one command and provided with a single precision floating point computing unit; the calculating circuitry configured to: estimate a state of an object based on the detection information obtained by the interface circuitry; and generate the state information according to the state of the object; the main processor configured to: shift to the first operation mode base on a timing which the state information is input from the interface circuitry; generate output information during the first operation mode based on the state information generated by the state estimation processor.

These and other objects, features, aspects and advantages of the present invention will become more apparent from the following detailed description of the present invention when taken in conjunction with the accompanying drawings.

BRIEF DESCRIPTION OF THE DRAWING

FIG. 4 shows the figure which compared the case where sequential processing of the 12-axes information was carried out with the case where a DSP processes the 12-axes information.

DESCRIPTION OF THE PREFERRED EMBODIMENTS

The detailed description of preferred embodiments of the present invention is made below, referring to the accompanying drawings. It should be noted that the descriptions related to a direction or an orientation correspond to the drawings for the convenience of description unless otherwise specified, but do not limit products, merchandized products, and the scope of the invention, for example.

The present application claims priority from Japanese Application Number 2014-071782 filed in Japan on Mar. 31, 2014, the contents of which are incorporated herein by reference.

Figure 1:
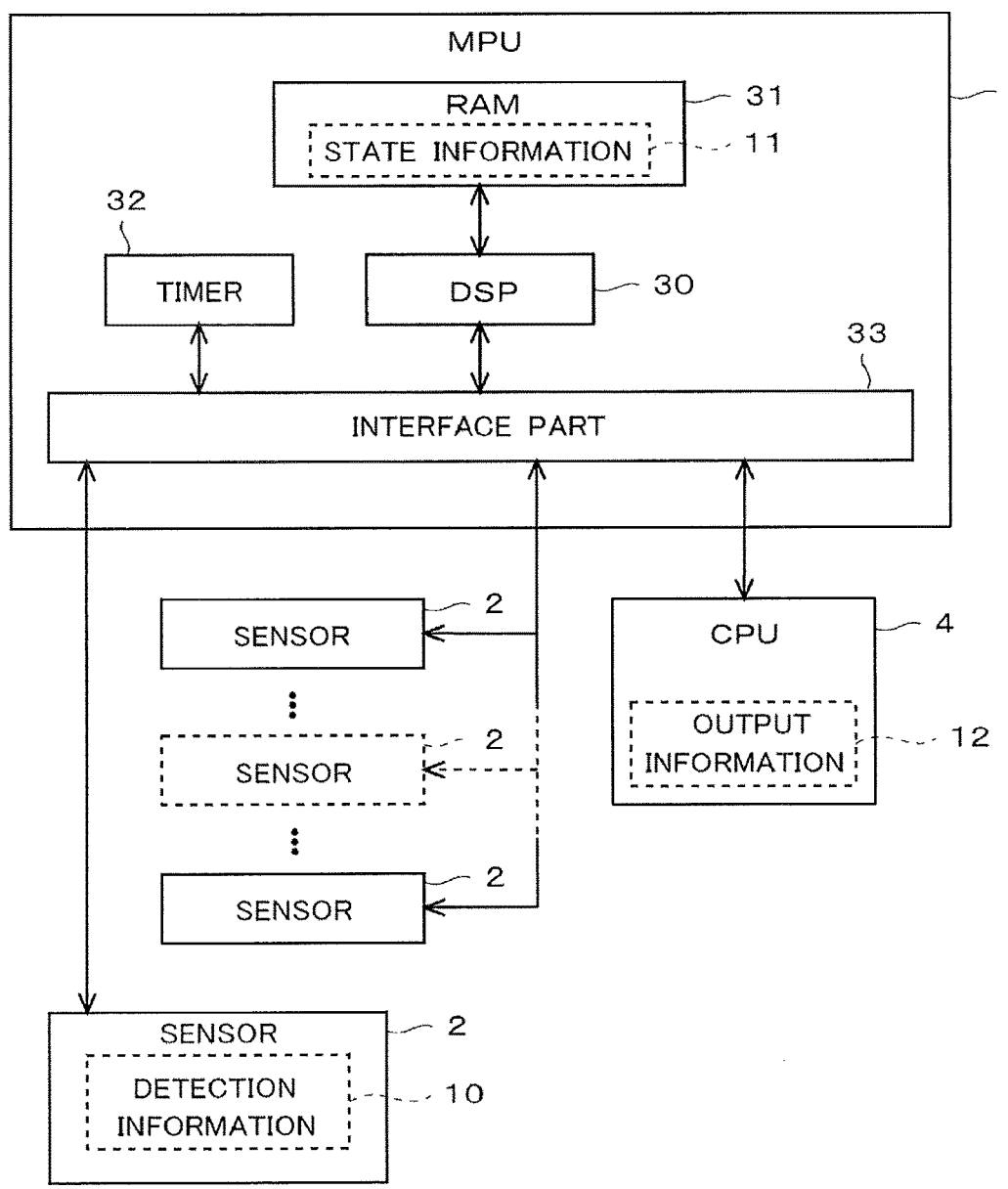
FIG. 1 shows a state estimation system.

FIG. 1 shows a state estimation system 1. The state estimation system 1 includes one or more sensor 2, a MPU (Micro-Processing Unit) 3 and a CPU 4.

In the following descriptions, the state estimation system 1 is described as what is incorporated in the portable terminal device (for example, a smart phone, a mobile phone and PDA, etc.) carried by a user.

The sensor 2 is a detection device which detects the information about the surrounding environment and a motion for example, and generates the detection information 10. A temperature sensor, a humidity sensor, an illuminance sensor, an air pressure sensor, a contact sensor, an acceleration sensor, a gyro sensor, or a magnetic sensor is assumed as the sensor. However, the sensor 2 is not limited to these. The state estimation system 1 must not be provided with all the sensors enumerated here, either.

In the following descriptions, a user who carries the portable terminal device is considered to be an object. And the state estimation system 1 shall generate output information 12 by estimating the state (condition, action) of the user. Therefore, the sensor 2 in the preferred embodiment is described as a structure including an acceleration sensor, a gyro sensor, and a magnetic sensor, in order to detect physical quantity required in order to estimate the user's action. As the user's action estimated, a walking condition, a state of rest, a talking state, an inspection state, or a riding state is assumed, for example.

Each sensor 2 is connected all to the MPU 3 to show it in FIG. 1. And the detection information 10 obtained by each sensor 2 is outputted towards the MPU 3.

The MPU 3 is provided with a DSP (Digital Signal Processor) 30, a RAM 31, a timer 32, and an interface part 33.

The DSP 30 is an arithmetic circuit which reads a command stored in the RAM 31 and operates according to the command. In the preferred embodiment, the command executed in the DSP 30 is expressed as 64-bit data constituted so that it might correspond to three parallel VLIW (Very Long Instruction Word). Therefore, the DSP 30 can execute three actual instructions in one cycle (The details are mentioned below.). The command shall be analyzed by the decoder (not shown) and shall be written in the RAM 31.

The DSP 30 reads the value of each sensor 2 according to the interrupt signal (hereinafter, referred to as a "detection timing signal") input from the timer 32. That is, the DSP 30 has the function to obtain the detection information 10 obtained by the sensor 2 through the interface part 33, and to store it in the RAM 31.

The DSP 30 estimates the state of the object based on the detection information 10 stored in the RAM 31 and generates the state information 11. The details of the DSP 30 are mentioned below.

The RAM 31 is a storage device used as working area of the DSP 30, and it is used in order to memorize various information. For example, the RAM 31 memorizes the state information 11 generated by the DSP 30. In addition, the RAM 31 also memorizes the detection information 10 (not shown in FIG. 1) obtained from each sensor 2.

For simplifies, FIG. 1 shows the RAM 31 as if it was a single structure. However, the RAM 31 is usually formed by a plurality of types of storage devices. In addition, the information read from the RAM 31 is illustrated in FIG. 1 so as to pass through the DSP 30 by all means. But the RAM 31 is provided with the storage area (storage device) which can be referred by the CPU 4, and the CPU 4 is constructed to be able to read desired information from the RAM 31 without relaying the DSP 30.

The timer 32 generates a detection timing signal periodically (in the preferred embodiment 100 [Hz]), and outputs it to the DSP 30 via the interface part 33. As already describe, when the detection timing signal is received, the DSP 30 reads the value of each sensor 2 and stores it in the RAM 31 as the detection information 10.

The interface part 33 is connected with each sensor 2. As shown in FIG. 1, the sensor 2 is connected to the MPU 3 by the parallel state or the serial state. The interface part 33 is connected with the CPU 4. Thus, the interface part 33 has a function to connect the MPU 3 and each sensor 2, and a function to connect the MPU 3 and the CPU 4. Therefore, the interface part 33 has a function which obtains the detection information 10 obtained by the sensor 2, and a function which outputs to the CPU 4 the state information 11 generated by the DSP 30.

Thus, the MPU 3 has a function which generates the state information 11 based on the detection information 10 obtained by the sensor 2, and a function which outputs the detection information 10 towards the CPU 4. That is, the MPU 3 is equivalent to the state estimation processor in the present invention. The details of the MPU 3 are mentioned below.

The CPU 4 functions as a main processor in portable terminal device. Although omitted for details, storage devices, operating parts (e.g., keys and buttons), a display part (e.g., a liquid crystal display), a loudspeaker which outputs a sound, a microphone which converts a sound to an electrical signal, the communications unit which communicates between external devices, and the like are connected to the CPU 4 as appropriate.

The CPU 4 executes a program stored in the storage device (not shown) while reading it, thereby performing calculation of various types of data, creation of control signals, and the like. Thus, the CPU 4 has a function of controlling other composition with which the MPU 3 and the portable terminal device, and a function of calculating and creating various types of data.

The CPU 4 outputs a DSP wake-up signal to the MPU 3 according to predetermined applications (for example, course guidance application etc.) having been started. On the contrary, according to the timing which ends predetermined application, the CPU 4 outputs a DSP reducing signal to the MPU 3. The CPU 4 generates the output information 12 based on the state information 11 input from the MPU 3. The CPU 4 provides the output information 12 for the user by outputting the output information 12 to the display part (not shown).

The CPU 4 has CPU normal operation mode. And the CPU 4 also has CPU reducing operation mode in which power consumption is smaller than the CPU normal operation mode. The CPU reducing operation mode is operational mode what is called "a sleep mode" for example, and the CPU reducing operation mode is operational mode in which only some restricted circuits in CPU 4 are working.

In the CPU 4, operational mode changes from the CPU reducing operation mode to the CPU normal operation mode according to the CPU wake-up signal outputted from the MPU 3. In the CPU 4, operational mode changes from the CPU normal operation mode to the CPU reducing operation mode according to the CPU reducing signal outputted from the MPU 3. However, even if it is a case where the CPU reducing signal is received from the MPU 3, when other applications are being performed, the CPU 4 does not shift to the CPU reducing operation mode.

Figure 2:
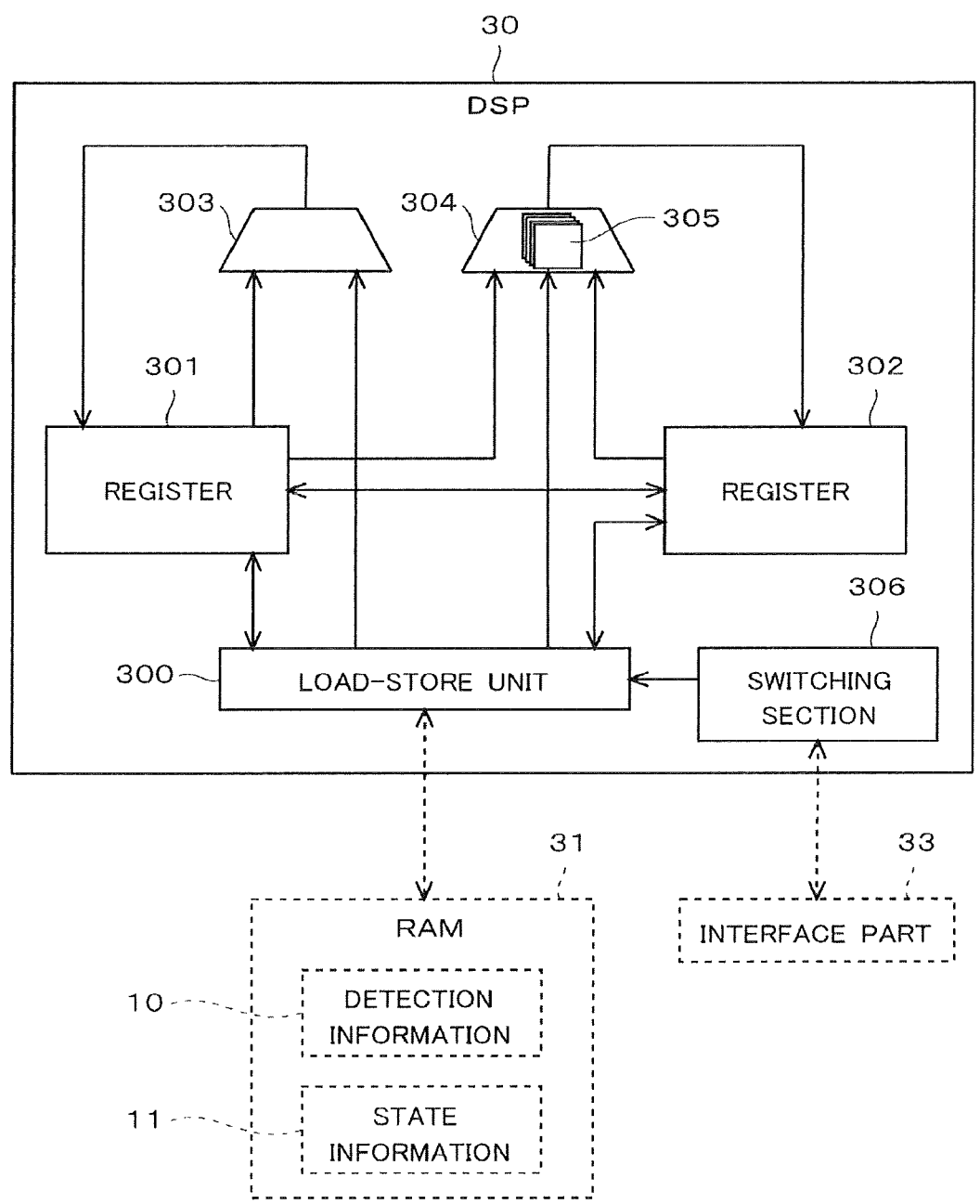
FIG. 2 is a schematic view showing the circuit configuration of a DSP.

FIG. 2 is a schematic view showing the circuit configuration of the DSP 30. The DSP 30 is provided with a load-store unit 300, two registers 301 and 302, two arithmetic logic units 303 and 304, four single precision floating point computing units 305, and a switching section 306 as shown in FIG. 2.

The load-store unit 300 reads data from the RAM 31, and stores it to the register 301 and 302. The load-store unit 300 stores data stored in the register 301 and 302 to the RAM 31. The load-store unit 300 sets the command (the command read from RAM 31) to the arithmetic logic units 303 and 304. When the value stored in the register 301 is a pointer value, the load-store unit 300 has a function to specify the data stored in the RAM 31 according to the pointer value, and a function to read it.

The registers 301 and 302 are storage device which store data temporarily. The data read from the RAM 31, the value calculated by the arithmetic logic units 303 and 304, and the like are stored in the registers 301 and 302.

The arithmetic logic unit 303 is an integer-arithmetic logic unit which performs a predetermined operation to the data stored in the register 301 according to the command input from the load-store unit 300. The value calculated by the arithmetic logic unit 303 is stored in the register 301. For example, the arithmetic logic unit 303 is used in order to calculate the pointer value for reading desired data from the RAM 31.

The arithmetic logic unit 304 is constituted as a SIMD (Single Instruction Multiple Data) type computing unit provided with the four single precision floating point computing units 305. The arithmetic logic unit 304 can execute one command in parallel to the data (namely, a plurality of data) set to each of the four single precision floating point computing units 305 (in 1 cycle). The value calculated by the arithmetic logic unit 304 is stored in the register 302, and is stored in the RAM 31 by the load-store unit 300.

The switching section 306 has a function to switch operational mode of the DSP 30 between first operational mode and the second operational mode in which power consumption is smaller than the first operational mode. In other words, the DSP 30 has two operational mode. One is DSP normal operation mode. Another is DSP reducing operation mode in which power consumption is smaller than the DSP normal operation mode.

According to the DSP reducing signal input from the interface part 33, the switching section 306 switches the DSP normal operation mode of the DSP 30 to the DSP reducing operation mode. The DSP reducing signal is input via the interface part 33 from the sensors 2 (It is not limited to all sensors) or the CPU 4 as an interrupt signal. The DSP 30 may change oneself to the DSP reducing operation mode.

According to the DSP wake-up signal input from the interface part 33, the switching section 306 switches the DSP reducing operation mode of the DSP 30 to the DSP normal operation mode. The DSP wake-up signal is input via the interface part 33 from the sensors 2 (It is not limited to all sensors) or the CPU 4 as an interrupt signal. The detection timing signal from the timer 32 may also function as the DSP wake-up signal.

FIG. 2 illustrates it as if the control object of the switching section 306 is only the load-store unit 300. However, this is simplification for drawing FIG. 2. The switching section 306 is able to perform switching control for any constitution (circuit) that the DSP 30 includes.

The above is the description of the structure and functions of the state estimation system 1. Next, the structure of the operation (operation architecture) by the DSP 30 is described. The DSP 30 performs data processing (processing to acquire the state information 11) to the detection information 10 not in the DSP reducing operation mode but in the DSP normal operation mode.

Figure 3:
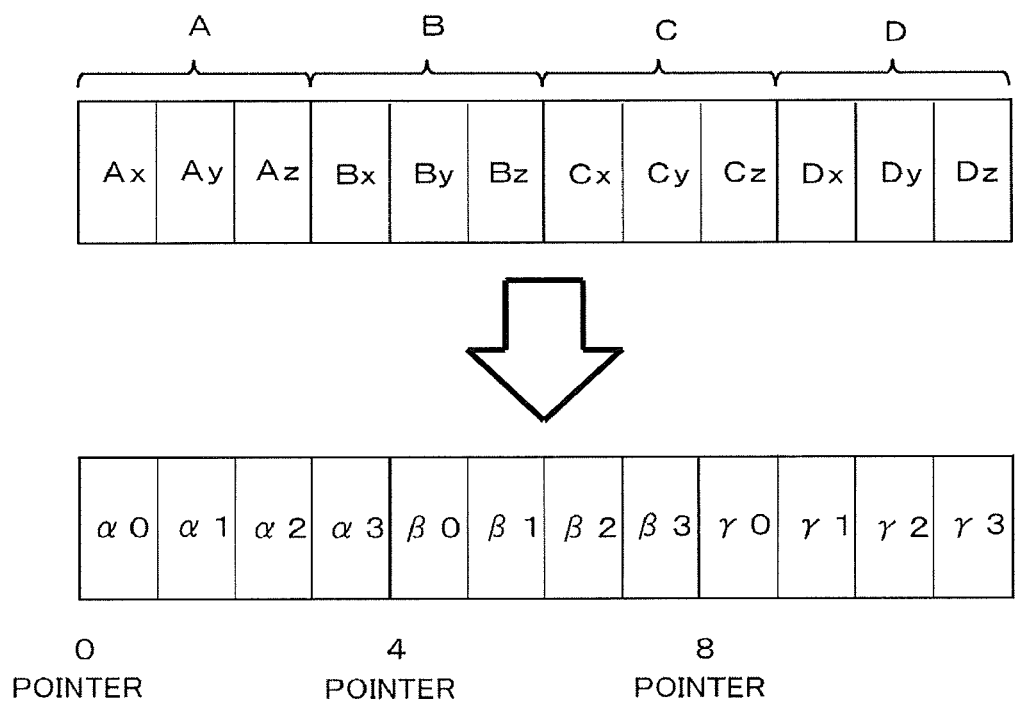
FIG. 3 is a conception diagram showing the data which the DSP processes.

FIG. 3 is a conception diagram showing the data which the DSP 30 processes.

In the following description, a motion of the portable terminal device with which the state estimation system 1 is incorporated is observed. And the case where the action of the user possessing the portable terminal device is estimated is described, for an example.

"A", "B", "C", and "D" which are shown in FIG. 3 show a mass of data. For example, in the case where "A" is an output of the 3-axis acceleration sensor, "Ax" is a value of X-axis component of acceleration, "Ay" is a value of Y-axis component of acceleration, and "Az" is a value of Z-axis component of acceleration. In the case where "B" is an output of the 3-axis gyro sensor, "Bx" is a value of X-axis component of angular velocity, "By" is a value of Y-axis component of angular velocity, and "Bz" is a value of Z-axis component of angular velocity. In the case where "C" is an output of the 3-axis magnetic sensor, "Cx" is a value of X-axis component of magnetic vector, "Cy" is a value of Y-axis component of magnetic vector, and "Cz" is a value of Z-axis component of magnetic vector. In the case where "D" is the correction value of the bias of the 3-axis gyro sensor, "Dx" is the correction value of X-axis component of angular velocity, "Dy" is the correction value of Y-axis component of angular velocity, and "Dz" is the correction value of Z-axis component of angular velocity.

The correction value of the bias of the gyro sensor is not the detection information 10 obtained from the sensor 2 directly. Since the technique of calculating the correction value of the bias of the gyro sensor can apply various technology proposed from the former, it omits a specific description here.

Thus, when observing a motion of portable terminal device and estimating a state, it is common that 12-axes information will be processed as mentioned above. However, it becomes 9-axes in estimating a state for example, without adopting the value of the magnetic sensor. That is, for state estimation, it does not necessarily become an indispensable condition to process 12-axes information, and it is changed as appropriate according to the demand of application.

The DSP 30 divides 12-axes information into alpha0, alpha1, alpha2, alpha3, beta0, beta1, beta2, beta3, gamma0, gamma1, gamma2 and gamma3, and processes it.

FIG. 4 shows the figure which compared the case where sequential processing of the 12-axes information is carried out with the case where the DSP 30 processes the 12-axes information. In FIG. 4, the minute description about a detailed operation is omitted, and processing is shown as a conception diagram so that it may be easy to understand the characteristics in the DSP 30.

In the case of sequential processing, as shown in the left table of FIG. 4, the data of alpha 0 (Ax) is processed, after loading from the RAM 31 during the first cycle, calculating a pointer during the second cycle for the next data and multiplying during the third cycle, it becomes the flow of storing a result in the RAM 31 during the fourth cycle. Therefore, 48 cycles is needed in order to complete processing about all 12-axes information.

On the other hand, in the DSP 30, the instruction set corresponds to three parallel VLIW. Therefore, the DSP 30 can execute three actual instructions in one cycle. As already described, the arithmetic logic unit 304 is the SIMD type computing unit, and is provided with the four single precision floating point computing units 305 as an execution unit. Therefore, the DSP 30 can execute one command (for example, multiply operation) to four data in the arithmetic logic unit 304 by one cycle.

Therefore, as shown in the right table of FIG. 4, alpha (alpha0, alpha1, alpha2, alpha3) is read in a first cycle. In a second cycle, beta (beta0, beta1, beta2, beta3) is read and a pointer is calculated by the arithmetic logic unit 303. In a third cycle, gamma (gamma0, gamma1, gamma2, gamma3) is read, a pointer is calculated by the arithmetic logic unit 303, and multiplication of alpha (alpha0, alpha1, alpha2, alpha3) is executed by the arithmetic logic unit 304. Further, in the fourth cycle, alpha (alpha0, alpha1, alpha2, alpha3) is written in the RAM 31, a pointer is calculated by the arithmetic logic unit 303, and multiplication of beta (beta0, beta1, beta2, beta3) is executed by the arithmetic logic unit 304.

Thus, for detection information 10 to be provided by one observation, the DSP 30 can complete processing at six cycles. Therefore, compared with the case where sequential processing is carried out by main CPU like before, the clock frequency of the MPU 3 (the DSP 30) can be lowered.

Therefore, the DSP 30 can reduce power consumption compared with the conventional microcomputer. In a common microcomputer, although the clock frequency of around 80 [MHz] is required for such processing, the DSP 30 in the preferred embodiment can be processed by around 7 [MHz].

In the circuit structure of computing unit, there are the characteristics that a floating point arithmetic machine has small size compared with a fixed-point arithmetic machine, generally. However, in a calculation with a floating point arithmetic machine, the position of a decimal point must be determined, calculation depth becomes deep. Therefore, in a calculation with a floating point arithmetic machine, the additional circuit is independently needed. That is, there is a situation that the circuit structure as the whole became small as a result in the direction at the time of adopting a fixed-point arithmetic machine. Therefore, in a general microcomputer, not a floating point arithmetic machine but a fixed-point arithmetic machine is used in many cases.

However, such an additional circuit is composed of the minimum in the use of processing the detection information 10 from the sensor 2 and estimating a state. Therefore, the DSP 30 makes circuit structure small by adopting the single precision floating point computing unit 305 compared with the case where a fixed-point arithmetic machine is adopted.

Particularly, the Kalman filter used for sensor fusion has a characteristic that the dynamic range of the parameter is wide. Therefore, it is necessary to prepare for a 64-bits operation device to maintain operation precision at the same level as the single precision floating point computing unit 305 (16 bits) using a fixed-point arithmetic machine, and a circuit structure enlarges. That is, when the DSP 30 performs the operation using the Kalman filter, the effect which adopts the single precision floating point computing unit 305 becomes more remarkable.

Next, a method for controlling the sensor 2, the MPU 3, and the CPU 4 in the state estimation system 1 is described.

Figure 5:
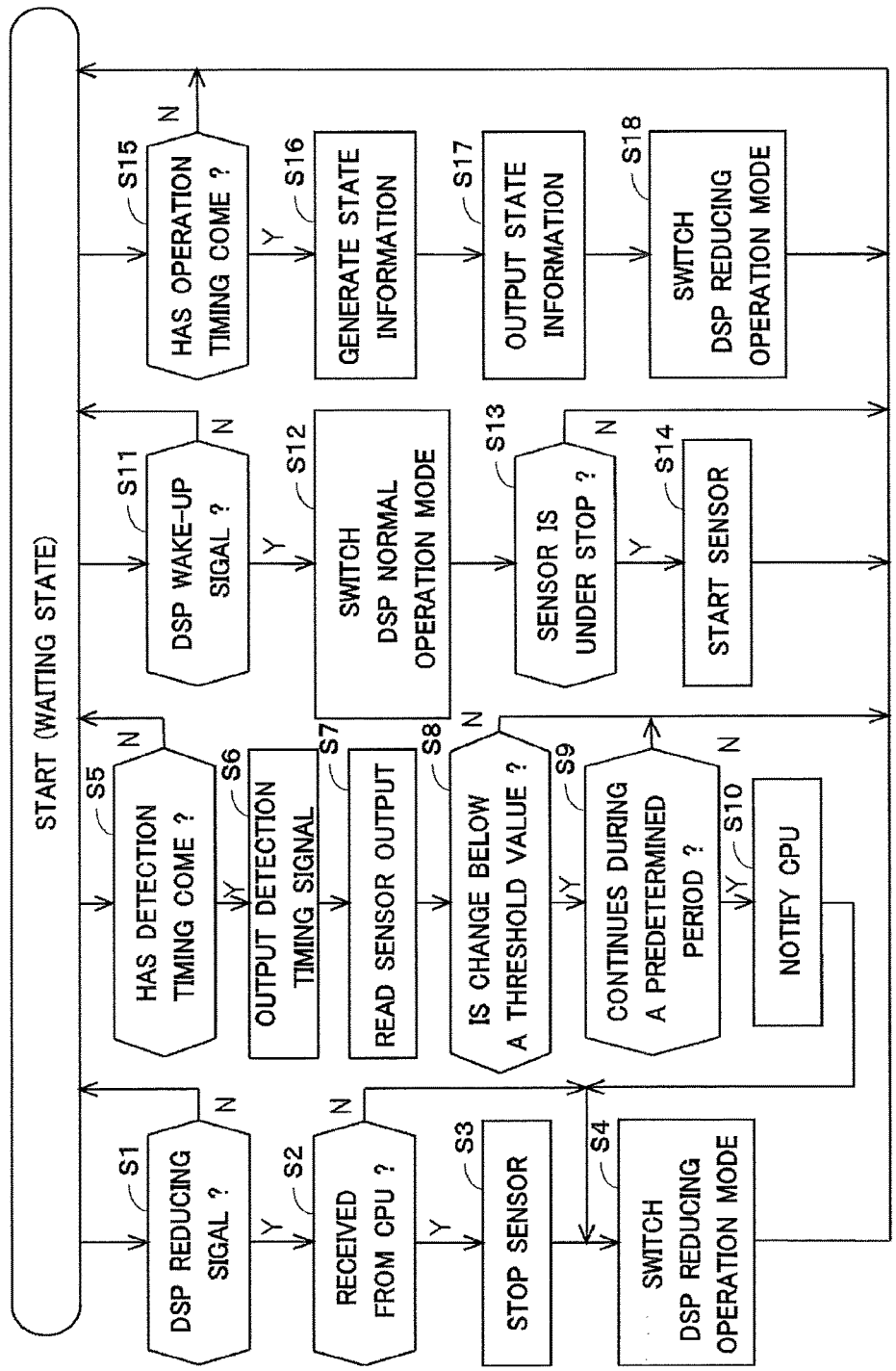
FIG. 5 is a flow chart showing operation of the MPU.

FIG. 5 is a flow chart showing operation of the MPU 3. When a power supply is put into the state estimation system 1 (the portable terminal device), the MPU 3 becomes waiting state after having carried out predetermined initial setting. The waiting state is either of the DSP normal operation mode or the DSP reducing operation mode.

In the waiting state, the MPU 3 is placed in a state in which it monitors reception of the DSP reducing signal (Step S1), arrival of a detection timing (Step S5), reception of the DSP wake-up signal (Step S11), and arrival of a operation timing (Step S15).

In the waiting state, when the DSP reducing signal is received, the MPU 3 gives Yes as the result in the decision in Step S1, and it identifies an origin of the transmission of the DSP reducing signal.

When the origin of the transmission of the DSP reducing signal is the CPU 4 (Yes in Step S2), the MPU 3 suspends the sensor 2 (Step S3). And the switching section 306 switches operational mode of the DSP 30 to the DSP reducing operation mode (Step S4).

Thus, when Step S4 is executed, henceforth, the DSP 30 becomes the DSP reducing operation mode and power consumption is reduced compared with the time of the DSP normal operation mode. After executing Step S4, the MPU 3 returns to the waiting state.

If the DSP reducing signal is transmitted by the CPU 4, the application which needs the state information 11 is ended and the CPU 4 can consider that the state information 11 is not needed henceforth. In such a case, the state estimation system 1 reduces power consumption further by stopping sensing by the sensor 2.

After executing Step S3, it is not necessary to read the output of the sensor 2. Therefore, the MPU 3 (the switching section 306) may stop the timer 32. In Step S3, the state estimation system 1 (the MPU 3) may not stop all the sensors 2, and it may select the sensor to stop according to a situation.

On the other hand, when the origin of the transmission of the DSP reducing signal is not the CPU 4 (No in Step S2), the MPU 3 skips Step S3 and executes Step S4. Therefore, henceforth, the DSP 30 becomes the DSP reducing operation mode and returns to the waiting state.

If the DSP reducing signal is not transmitted by the CPU 4, it can be considered that the CPU 4 needs the state information 11. Therefore, as for sensing by the sensor 2, it is preferable to make it continue in this case, without stopping the sensor 2.

The case where the origin of the transmission of the DSP reducing signal is not the CPU 4, the case where the sensor 2 becomes a transmitting agency, the case where the DSP 30 the very thing tends to switch oneself in the DSP reducing operation mode, etc. are assumed.

In the waiting state, when the detection timing has come (Yes in Step S5), the timer 32 outputs the detection timing signal, as an interrupt signal, towards the DSP 30 (Step S6). According to this, the MPU 3 reads the output of each sensor 2 (Step S7). In this manner, the detection information 10 is stored in the RAM 31.

Next, the MPU 3 compares the output value of the sensor 2 read in Step S7 with the output value of the sensor 2 read when Step S7 was performed last time, and it judges whether the difference is below a threshold value (Step S8).

The case where the difference is below the threshold value is a case in which the change in a state is scarce. Therefore, when the MPU 3 gives Yes as the result in Step S8, the MPU 3 further judges whether such a state continues during a predetermined period (Step S9).

When the MPU 3 gives Yes as the result in Step S9, the MPU 3 notifies the CPU 4 that the state does not have a change (Step S10). And when Step S10 is executed, the switching section 306 shifts the DSP 30 to the DSP reducing operation mode (Step S4).

Thus, when the scarce state of the change continues during a predetermined period in the detection information 10, the state estimation system 1 can reduce power consumption by switching the DSP 30 to the DSP reducing operation mode. It can be constituted so that each sensor 2 judges whether a change is scarce in the detection information 10. In this case, it can be constituted so that each sensor 2 transmits the judgment together with the detection information 10 to the MPU 3.

On the other hand, when it is No in Step S8 or S9, the MPU 3 returns to the waiting state, without executing Step S10.

In the waiting state, when the DSP wake-up signal is received (Yes in Step S11), the switching section 306 switches operational mode of the DSP 30 to the DSP normal operation mode (Step S12). Therefore, the DSP 30 returns to the DSP normal operation mode.

When Step S12 is executed, the MPU 3 decides whether the sensor 2 is under stop (Step S13). And when the stopped sensor 2 exists, the MPU 3 starts the stopped sensor 2 (Step S14). Thus, the stopped sensor 2 returns. When the decision result is No in Step S13 or Step S14 is executed, the MPU 3 returns to the waiting state.

In the waiting state, when the operation timing has come (Yes in Step S15), the DSP 30 executes a predetermined operation, estimates the user's condition, and generates the state information 11 (Step S16). The arrival of the operation timing establishes the exclusive timer in the MPU 3 and may be decided periodically. The arrival of the operation timing may be decided by the fact that the CPU 4 requests to output the state information 11.

The state information 11 is stored in the RAM 31 by execution of Step S16. When the decision result is Yes in Step S15 and the DSP 30 is in the DSP reducing operation mode, the switching section 306 switches the DSP 30 to the DSP normal operation mode before Step S16 is executed.

When Step S16 is executed, the MPU 3 (the interface part 33) outputs the newly created state information 11 to the CPU 4 (Step S17).

The CPU 4 receives the state information 11 by execution of Step S17. Therefore, the CPU 4 which received the state information 11 creates the output information 12 based on the received state information 11. When executing Step S17, in the case where operational mode of the CPU 4 is the CPU reducing operation mode, before executing Step S17, the MPU 3 outputs the CPU wake-up signal to the CPU 4.

When Step S17 is executed, the switching section 306 switches operational mode of the DSP 30 to the DSP reducing operation mode once (Step S18).

Thus, whenever the MPU 3 completes the output of the new state information 11, the switching section 306 makes the DSP 30 shift to the DSP reducing operation mode. Therefore, power consumption is reduced further.

When Step S18 is executed, the MPU 3 returns to the waiting state.

As mentioned above, the MPU 3 has the interface part 33 obtains the detection information 10 obtained by the sensor 2 and outputs the state information 11 to the CPU 4, and the DSP 30 has the arithmetic logic unit 304 is constituted as a SIMD type computing unit provided with the four single precision floating point computing units 305. The DSP 30 processes a plurality of information by one command. The DSP 30 estimates the state of the object based on the detection information 10 obtained by the interface part 33, and generates the state information 11 according to the state of the object. Thereby, the MPU 3 can lower the frequency of the DSP 30. Additionally, the MPU 3 can make circuit structure small compared with the case where a fixed-point arithmetic machine is adopted. Therefore, power consumption can be reduced.

The DSP 30 estimates the state of the object using the Kalman filter to the detection information 10, and generating the state information 11. That is, the DSP 30 produces a still higher effect compared with a processor provided with a fixed-point arithmetic machine.

The DSP 30 processes 6-axes or more (preferably 9-axes or more, and more preferably 12-axes or more) of information in parallel based on the detection information 10. Thus, a still higher effect is produced by processing the information about the multiple spindle which occurs simultaneously.

The MPU 3 further has the switching section 306 switches operational mode of the DSP 30 between the DSP normal operation mode and the DSP reducing operation mode. The DSP reducing operation mode is operational mode in which power consumption is smaller than the DSP normal operation mode. The DSP 30 generates the state information 11 in the DSP normal operation mode. Thereby, in the period which does not generate the state information 11 for example, operational mode can be switched in the DSP reducing operation mode, and power consumption can be reduced further.

The switching section 306 switches operational mode between the normal operation mode and the reducing operation mode according to the demand from the CPU 4. Thereby, the MPU 3 can be used according to the starting application, for example. Therefore, the MPU 3 can be used efficiently.

According to the demand (the DSP wake-up signal) from the CPU 4, the MPU 3 changes from the DSP reducing operation mode to the DSP normal operation mode and starts the sensor 2. In this manner, when the CPU 4 desires the information, the MPU 3 starts the sensor 2 beforehand and can change into the state where the detection information 10 is acquirable.

The switching section 306 switches operational mode of the DSP 30 between the DSP normal operation mode and the DSP reducing operation mode according to the detection information 10 from the sensor 2. Especially, the switching section 306 switches the operational mode to the DSP reducing operation mode, when the state where the change in the detection information 10 from the sensor 2 has become below the threshold value continues for a predetermined period. In this manner, when a possibility that the state of the object turned into a stationary state is high, the switching section 306 switches operational mode to the DSP reducing operation mode in which power consumption is low. Therefore, power consumption can be reduced.

When the DSP 30 is in the DSP reducing operation mode and the change in the detection information 10 from the sensor 2 changes into a larger state than the threshold value, the switching section 306 switches operational mode of the DSP 30 to the DSP normal operation mode with the DSP wake-up signal from the sensor 2. Thus, when a possibility that the state of the object changed is high, the DSP 30 shifts to the DSP normal operation mode promptly and estimates the state of the object. Therefore, change of the state of the object can be promptly notified to the CPU 4.

As mentioned above, although described about the preferred embodiment of the invention, the present invention is not limited to the above mentioned embodiment, and various deformation is possible for it.

For example, the steps shown in the preferred embodiment are mere examples. The steps are not limited to the order and the contents described above. That is, if the same effect can be obtained, the order or the contents may be modified as appropriate. For example, when Step S7 is performed and the new detection information 10 is stored in the RAM 31, the MPU 3 may generate the state information 11 by executing Step S16, and may output the state information 11 by executing Step S17.

The single precision floating point computing unit 305 is adopted for example in the above preferred embodiment, it may not be limited to "single-precision". A double-precision-floating-point computing unit may be adopted, for example.

Further, for example, the timer which determines the timing which returns the DSP 30 to the DSP normal operation mode from the DSP reducing operation mode, may be provided. When such a timer is provided and the DSP 30 returns to the DSP normal operation mode by the timer, and when the change in the detection information 10 from the sensor 2 is below the threshold value, the interface part 33 may output the information in which indicates that there is no change of the state of the object, towards the CPU 4. And in this case, the switching section 306 may make the DSP 30 shift to the DSP reducing operation mode. In this manner, creation of the state information 11 by the DSP 30 can be avoided, and it can shift to the DSP reducing operation mode in a short time compared with the case where the new state information 11 is generated. It is effective especially in a case when CPU 4 is demanding the state information 11 periodically and when no change will be in a state.

During the CPU reducing operation mode and when it can be considered that there is no change of a state of an object, the interface part may be forbidden from outputting the information (the state information 11, the information which indicates there is no change of the state of the object) to the CPU 4. In this manner, the useless start of the CPU 4 is controlled and the power consumption is more reduced.

In addition, the MPU 3 is provided with the user interface and a structure in which a liquid crystal panel is connected with the MPU 3 may be adopted.

In the above preferred embodiment, an example is described in which the user is the object and the state of the user is estimated. However, the object may not be limited to the user and may be portable terminal device (state estimation system 1), for example. In this case, an attitude, a state of rest, or portable states (a gesture, fixing, etc.) are assumed to be the states where it is estimated.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. A state estimation processor connected to an external detection device and an external computer, comprising:
   interface circuitry configured to obtain detection information obtained by the external detection device and output state information to the external computer;
   calculating circuitry including a SIMD type arithmetic processing circuitry processes a plurality of information by one command and provided with at least four single precision floating point computing circuits, the one command being executed in parallel to a plurality of data set to each of the at least four single precision floating point computing circuits in a single cycle;
   the calculating circuitry configured to:
     estimate a state of an object based on the detection information obtained by the interface circuitry;
     generate the state information according to the state of the object;
     compare first detection information received at a first point in time with second detection information received at a second point in time, which is subsequent to the first point in time;
     control the interface circuitry to output a notification to the external computer when it is determined that a difference between the first detection information and the second detection information is less than a predetermined threshold value; and
     switch an operational mode from a first operation mode, during which the state information is generated, to a second operation mode in which power consumption is smaller than the first operation mode after controlling the interface circuitry to output the notification to the external computer.

2. The state estimation processor according to claim 1, wherein
   the calculating circuitry configured to estimate the state of the object using a Kalman filter to the detection information, and generates the state information.

3. The state estimation processor according to claim 1, wherein
   the calculating circuitry configured to processes 6 or more axes information in parallel based on the detection information.

4. The state estimation processor according to claim 3, wherein
   the calculating circuitry configured to processes 9 or more axes information in parallel based on the detection information.

5. The state estimation processor according to claim 4, wherein
   the calculating circuitry configured to processes 12 or more axes information in parallel based on the detection information.

6. A state estimation system, comprising:
   a detection device obtains detection information;
   a main processor works in first operation mode, and second operation mode in which power consumption is smaller than the first operation mode; and
   a state estimation processor connected to the detection device and the main processor;
   wherein
     the state estimation processor, including:
       an interface circuitry configured to obtain detection information obtained by the detection device and output state information to the main processor; and
       a calculating circuitry including a SIMD type arithmetic processing circuitry processes a plurality of information with one command and provided with a single precision floating point computing unit;
     the calculating circuitry configured to:
       estimate a state of an object based on the detection information obtained by the interface circuitry; and
       generate the state information according to the state of the object;
     the main processor configured to:
       shift to the first operation mode based on a timing which the state information is input from the interface circuitry;
       generate output information during the first operation mode based on the state information generated by the state estimation processor.

7. The state estimation system according to claim 6, wherein
   the state estimation processor, further comprising:
   a switching circuitry configured to switch operational mode of the calculating circuitry between third operation mode and fourth operation mode in which power consumption is smaller than the third operation mode.

8. The state estimation system according to claim 7, wherein
   the switching circuitry configured to switch operational mode of the calculating circuitry between third operation mode and fourth operation mode according to a demand from the main processor.

9. The state estimation system according to claim 8, wherein
   the state estimation processor starts the detection device when the calculating circuitry changes from the fourth operation mode to the third operation mode according to a demand from the main processor.

10. The state estimation system according to claim 7, wherein
    the switching circuitry configured to switch operational mode of the calculating circuitry between the third operation mode and the fourth operation mode according to the detection information from the detection device.

11. The state estimation system according to claim 10, wherein
the switching circuitry configured to switch to the fourth operation mode when the state where change in detection information from the detection device has become below a threshold value continues at a predetermined period.

12. The state estimation system according to claim 11, further comprising:
a timer determines timing in which the calculating circuitry returns to the third operation mode from the fourth operation mode; wherein
in a case where the calculating circuitry returns to the third operation mode with the timer, and also in a case where the change in the detection information from the detection device is below a threshold value, the interface circuitry configured to output that the state of the object does not have a change for the main processor, and the switching circuitry configured to switch the calculating circuitry to the fourth operation mode.

13. The state estimation system according to claim 12, wherein
in a case where the main processor is in the second operation mode, the interface circuitry configured to prohibit from outputting that the state of the object does not have a change.

14. The state estimation system according to claim 10, wherein
in a case where operational mode of the calculating circuitry is the fourth operation mode, and also in a case where a change in the detection information from the detection device changes into a larger state than a threshold value, the switching circuitry configured to switch the calculating circuitry to the third operation mode.

* * * * *